United States Patent
Gildfind et al.

(10) Patent No.: US 9,788,044 B1
(45) Date of Patent: *Oct. 10, 2017

(54) PERSONAL MEASUREMENT DEVICES FOR MEDIA CONSUMPTION STUDIES

(71) Applicant: Google Inc., Mountain View, CA (US)

(72) Inventors: Andrew Gildfind, London (GB);
Simon Michael Rowe, Berkshire (GB);
Ken Krieger, Jackson, WY (US);
James Robert Stewart, London (GB)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,850

(22) Filed: Nov. 16, 2016

Related U.S. Application Data (63) Continuation of application No. 14/109,124, filed on Dec. 17, 2013, now Pat. No. 9,510,038.

(51) Int. Cl.
  *H04N 7/16* (2011.01)
  *H04N 21/422* (2011.01)
  *H04N 21/63* (2011.01)
  *H04H 60/33* (2008.01)
  *H04N 21/4363* (2011.01)

(52) U.S. Cl.
  CPC .......... *H04N 21/422* (2013.01); *H04H 60/33* (2013.01); *H04N 21/43637* (2013.01); *H04N 21/632* (2013.01)

(58) Field of Classification Search
  None
  See application file for complete search history.

(56) References Cited

U.S. PATENT DOCUMENTS

| | | | |
|---|---|---|---|
| 6,799,047 B1 | 9/2004 | Bahl et al. | |
| 8,023,882 B2 | 9/2011 | Croy et al. | |
| 8,040,237 B2 | 10/2011 | Nielsen et al. | |
| 8,539,527 B2 | 9/2013 | Wright et al. | |
| 2005/0216509 A1 | 9/2005 | Kolessar et al. | |
| 2007/0266395 A1 | 11/2007 | Lee et al. | |
| 2008/0059988 A1 | 3/2008 | Lee et al. | |
| 2008/0148309 A1 | 6/2008 | Wilcox et al. | |
| 2008/0155583 A1 | 6/2008 | Falcon | |
| 2008/0163282 A1 | 7/2008 | Reponen et al. | |
| 2009/0070797 A1 | 3/2009 | Ramaswamy et al. | |
| 2009/0217315 A1 | 8/2009 | Malik et al. | |
| 2009/0300670 A1 | 12/2009 | Barish | |
| 2010/0077420 A1 | 3/2010 | Nielsen et al. | |

(Continued)

OTHER PUBLICATIONS

US Notice of Allowance for U.S. Appl. No. 14/109,124 dated Aug. 1, 2016.

(Continued)

*Primary Examiner* — Fernando Alcon
(74) *Attorney, Agent, or Firm* — Foley & Lardner LLP; John D. Lanza

(57) ABSTRACT

A method for conducting a media consumption study, includes at a processor of a position marker placed in a study site in a vicinity of a fixed media device; receiving a signal broadcast from a personal measurement device; determining signal information of the received broadcast signal, the signal information including identification information of the personal measurement device, and one or more signal characteristics; comparing the one or more signal characteristics to threshold values; and based on the comparison, determining the personal measurement device is in proximity to the fixed media device.

20 Claims, 7 Drawing Sheets

(56) References Cited

U.S. PATENT DOCUMENTS

| | | |
|---|---|---|
| 2010/0211439 A1 | 8/2010 | Marci et al. |
| 2012/0254934 A1 | 10/2012 | McBrearty et al. |
| 2013/0312018 A1 | 11/2013 | Elliott et al. |
| 2014/0109126 A1 | 4/2014 | Ivanov et al. |
| 2014/0236737 A1 | 8/2014 | Rowe |
| 2014/0250447 A1 | 9/2014 | Schink |
| 2014/0259033 A1 | 9/2014 | Ramaswamy et al. |
| 2014/0282640 A1 | 9/2014 | Nielsen |
| 2014/0344841 A1 | 11/2014 | Nielsen et al. |

OTHER PUBLICATIONS

US Office Action for U.S. Appl. No. 14/109,124 dated Dec. 2, 2014.
US Office Action for U.S. Appl. No. 14/109,124 dated Jun. 3, 2015.
US Office Action for U.S. Appl. No. 14/109,124 dated Mar. 17, 2016.

PERSONAL MEASUREMENT DEVICES FOR MEDIA CONSUMPTION STUDIES

CROSS-REFERENCE TO RELATED APPLICATIONS

This application is a continuation of, and claims priority under 35 U.S.C. §120 to, U.S. patent application Ser. No. 14/109,124, filed Dec. 17, 2013, titled "Personal Measurement Devices for Media Consumption Studies," which is incorporated herein by reference in its entirety.

BACKGROUND

Media consumptions studies attempt to estimate population behaviors based on observed activities of a population sample. A panel operator designs a panel, which consists of volunteers (known typically as panelists) who agree to be monitored while engaging in specific activities, such as watching television. The panelists' behaviors are recorded and analyzed, and then extrapolated to the larger population.

Assembling such a panel may be time consuming and expensive. Furthermore, errors in the data collection efforts will adversely affect the validity of any analysis and extrapolation. Finally, panelists may find the monitoring process to be cumbersome and inconvenient.

SUMMARY

A method for conducting a media consumption study, includes at a processor of a position marker placed in a study site in a vicinity of a fixed media device; receiving a signal broadcast from a personal measurement device; determining signal information of the received broadcast signal, the signal information comprising: identification information of the personal measurement device, and one or more signal characteristics; comparing the one or more signal characteristics to threshold values; and based on the comparison, determining the personal measurement device is in proximity to the fixed media device.

A system for conducting media consumption studies at study sites includes: personal measurement devices provided to panelists recruited for a media consumption study at a study site, comprising a first wireless signaling device that broadcasts a first attraction signal and a first identification; media device measurement devices provided for media devices at the study site, comprising a second wireless signaling device that broadcasts a second attraction signal and a second identification; a plurality of position markers, comprising: a receiver that receives the first and second attraction signals and the first and second identifications, a first processor that measures characteristics of the first and second attractions signals, and a transmitter that sends the measured characteristics and the first and second identifications; and a second processor that receives the measured characteristics and the first and second identifications and that executes instructions from a computer-readable storage medium to: estimate a panelist location of a panelist based on the measure characteristics and the identification of the first attraction signal, estimate a media device location of media device based on the measured characteristics and the identification of the second attraction signal, and identify the panelist as consuming media from the media device.

A system for conducting media consumption studies at a study site having one or more panelists, comprising: media devices configured with measurement devices that broadcast media device measurement device identifications and attraction signals; panelist devices that broadcast panelist device identifications and panelist device attraction signals; and position markers that receive attraction signals and identifications, determine a characteristic of an attraction signal, and transmit the characteristic and a corresponding identification to a remote server, the remote server, comprising: a computer-readable storage medium comprising instructions for conducting a media consumption study, and a processor that executes the instructions to: estimate a location in the study site of a media device; estimate a location in the study site of the panelist; correlate the location estimates to determine that the panelist consumed media at the media device.

A computer-readable storage medium having instructions for a media consumption study, wherein a processor executes the instructions to: receive signal information from a position marker placed in a study site, the signal information comprising: first attraction signal information broadcast by a personal measurement device carried by a panelist, and second attraction signal information broadcast by a media device measurement device; process the second attraction signal information to locate the media device in the study site; and process the first attraction signal information to locate the panelist relative to the media device.

DESCRIPTION OF THE DRAWINGS

The detailed description refers to the following figures in which like numerals refer to like items, and in which.

DETAILED DESCRIPTION

A panel is an assembly of individuals whose activities are monitored, reported, and analyzed as part of a media consumption study. Study participants, or panelists, agree to monitoring, reporting, and analysis of their media consumption activities, sometimes in return for compensation. Panelists are chosen to reflect a statistically representative sample of a larger population. The analysis of the panelists' activities is extrapolated to the larger population. Panels are used to determine television viewing habits, Internet Web usage, product purchases, and other activities.

Considering television viewing and Internet activity as examples of media consumption, one way to collect data is to require the panelists to record this activity in manual logs. Alternately, a panel operator may provide individual panelists, or households with multiple panelists, with metering devices that record and report the panelists' activities. For example, a panelist may agree to installation of a meter at the panelist's residence. The meter records the panelist's television viewing and Internet activity, and reports the data to a remote server. Along with agreeing to installation of the meter, the panelist also consents to the monitoring of television, Internet, and other activity as part of a media consumption study.

One challenge in the field of media consumption studies is panelist compliance; that is, do the panelists fully comply with all panel data monitoring, logging, and reporting requirements? Manual logging may be particularly difficult to enforce, as the panelists may be required to accurately log the time, date, location, and identity of their media consumption activities. As noted above, an alternative to manual logs is use of meters. Such meters may be installed on every media device in a participating household so as to record the viewing date, time, audio signature, and identity of the panelists consuming the media. Optionally, a meter may be installed in a router at the panelists' residence. The router-based meter is an intermediary device between the panelists' media devices and remote servers that supply or deliver media for consumption, and that process media consumption data. In one approach, panelists register their media devices and log in and out of viewing using the router-based meter. In either a manual logging or metered approach, however, the ultimate success of the media consumption study still rests on panelist compliance with the data collection requirements.

Furthermore, many media devices are mobile. An in-home, router-based meter may not capture panelist media consumption when the panelist operates a mobile media device such as a smart phone away from the panelist's residence. Thus, in some scenarios, panelist activities may not be recorded without some mechanism to log media consumption away from the residence. Even within a panelist's residence, particularly a multiple-panelist residence, accurate monitoring of media consumption by a specific panelist may be difficult, and may require each panelist to log in and log out when consuming media. Thus, full compliance with a panel's data logging requirements may not be achieved.

However, in practice, and depending on the data logging implementation, even perfect compliance may have drawbacks. For example, one goal of a media consumption study is to observe natural behavior of the panelist; the more the panelist is asked to log study-specific behavior, the less natural the measured behavior. On the one hand, with too little resolution in logging panelist activity, the value of the study data may be reduced and some potentially interesting panelist behaviors may go unrecorded. On the other hand, burdensome data logging requirements may adversely affect a panelist's experience and compliance.

Another challenge with media consumption studies is detecting the that panelists are in the vicinity of, or proximity to, media consumption devices such as a television program display device (e.g., a television) during the media consumption studies. Consider a media consumption study site, which may be a panelist's residence. A panelist may move from room to room in the residence and watch programs and advertisements on different media consumption devices in different rooms. The media consumption study may be intended to determine when the panelist is in proximity to a television when that television is displaying programs and advertisements. In an aspect, proximity to the television may be such that the panelist is able to perceive (see and/or hear) the programs and advertisements. Furthermore, multiple panelists may occupy the same residence. Distinguishing between panelists may further complicate data collection and analysis.

To address these issues of panelist compliance, data logging, mobile media device monitoring, attributed behavior, and other media consumption challenges noted herein, disclosed are personal measurements devices and associated analytics systems, and corresponding systems, for data capture, reporting, and analysis. In an embodiment, a media consumption study may include one or more personal measurement devices for each panelist, one or more position markers in communication with the personal measurement devices, and a mechanism to transmit data from the position marker to a server that analyzes the data to estimate that the panelists are in proximity to a television.

In an embodiment, a panelist may agree to wear a bracelet or other personal measurement device that provides a signal detectable by other components of a media consumption study system, either at a study site or at other locations that may be monitored. The bracelet may incorporate, for example, a smart RFID tag, a Bluetooth Low Energy (BILE) beacon, or other transmitting mechanism. Alternately, the panelist may agree to carry, or have on his person, a personal measurement device at all times or at certain specified times.

In another embodiment, in addition to wearable measurement devices, media devices may be associated with or attached to measurement devices similar to the personal measurement device. These other measurement devices may provide data to allow estimated locations for fixed and mobile media devices A measurement study, in an embodiment, may begin when a panel operator provides an in-home suite of devices to collect and report media consumption. The suite of devices may include the personal measurement devices equipped with BTLE beacons. Similar BILE devices may be affixed to media devices, such as fixed location televisions and mobile devices such as tablets. The BTLE beacons periodically advertise their presence in the study site by broadcasting signals that are detected by the position markers, also equipped with BTLE receivers. The position markers may act as BILE to WiFi gateways. The position markers may constantly scan for BTLE signals, and may relay information contained in the signals to a local central server or a remote server using wireless signaling. The information may be processed as part of a media consumption study along with media consumption data recorded in a router-based meter or in set top box logs. In an embodiment, the remote server may collect information related to the broadcast signals received at each of the position markers in the study site. A broadcast signal received at a first position marker may exhibit a first signal strength and may be received with a first arrival time. The same signal received at a second position marker may be received with a second signal strength lower than the first signal strength and with a second arrival time later than the first arrival time. In an embodiment, over time, when the signals are broadcast by a measurement device associated with a fixed media device, the remote server may develop an accurate mapping of the fixed media devices within the study site. When the signals are broadcast by a personal measurement device, the remote server, based on characteristics of the received signal such as signal strength and arrival time, may determine that the personal measurement device, and by inference the panelist is in proximity to a fixed media device. Similarly, if mobile media devices are equipped with measurement devices, signals received by the position markers may be analyzed to determine if the panelist is in proximity to a mobile media device.

Once the remote server has processed information from a sufficient number of broadcast signals (for panelists and, in an embodiment, media devices), the remote server may estimate, with some probability, that a specific panelist is in front of or near a specific media device; that is, the panelist is in proximity to a specific media device. The remote server may use this estimate to determine if the panelist is watching television, for example. The remote server then may use television channel tuning history as recorded in and provided by an in-home meter or set top box to attribute television viewing to the panelist.

In another embodiment, a media device may be equipped with a signaling device that broadcasts a signal that may be detected by a personal measurement device. The personal measurement device then may cause the information in the broadcast signal to be reported to a local or remote server.

As disclosed herein, a personal measurement device is a device that may be attributed to a panelist. A personal measurement device may be any device that a panelist may carry or wear, including, for example, a wrist band, a watch, a key chain, or an article of clothing.

Taking an example of a panelist's residence as a study site, a panelist may agree to installation of devices specifically intended to facilitate media consumption studies. For example, position markers could be installed near each fixed media device (e.g., television). In this example, each room in the residence in which a fixed media device is installed may include one or more position markers. Each position marker within the residence may receive an signal broadcast by a compatible personal measurement device. Any combination of received signal strength and time of signal arrival as well as other characteristic data or identifying data then may be used to determine the personal measurement device and hence the panelist is in proximity to the fixed media device.

In an embodiment, a wearable personal measurement device attributed to a panelist may act as a BILE beacon and may periodically broadcast signals that may be received by position markers or similar receiving devices. A broadcast signal may include a unique identification of the personal measurement device. The broadcast signal further may include a sequence number, which increments by one for each broadcast signal. The position markers may determine received signal strength of the broadcast signal. In an embodiment, the position markers may determine the personal measurement device is in proximity to the fixed media device based on the received signal strength. In another embodiment, the position markers may provide time (i.e., time of arrival) and day information, the unique identification, the sequence number, and the received signal strength to a local or remote server that subsequently processes the received information to determine the personal measurement device is in proximity to the fixed media device. In a further embodiment, the data provided by the position markers may be used at a remote server to estimate first and subsequent positions (i.e., a track) of the personal measurement device (and by attribution, a track of the panelist).

In an alternate embodiment, instead of, or in addition to, the BILE beacon, the position markers may use radio frequency identification (RFID) signaling, acoustic signaling, and other wireless signaling.

In another embodiment, a RFID transceiver in a position marker broadcasts a RF signal detectable by RFID tags emplaced in the personal measurement devices. The RFID tag then returns an acknowledgement signal including the identification of the personal measurement device.

In yet another embodiment, the personal measurement device broadcasts the RF signal, which then is detected by the position markers. The position markers then may cause information in the signal to be sent to a local central server or to a remote server.

In still another embodiment, the panelist's fixed and mobile media devices may provide this mobile media device movement monitoring. For example, devices in the study site may allow determination of movement of mobile media devices within the study site. If a television is on and being monitored in a living room and a panelist's smart phone is determined to be within six feet of the television, the systems may determine that the panelist is viewing the media being displayed on the television.

In a further embodiment, fixed media devices in the study site may be equipped to communicate with mobile media devices at the study site. In an aspect, the fixed media devices may transmit signals using, for example, BILE radios, and the mobile media devices may lock on to the signals. Wireless radios in the mobile media devices may search for a highest power signal, and when the mobile media device is located in a specific room of the study site, and that room includes a fixed media device with an appropriate transmitting device, the mobile media device may lock on to that fixed media device. This process may continue as the mobile media device is moved from one room to another (presumably by a panelist who owns or uses the mobile media device). The locked on indication may include a time stamp. Finally, the transmitting devices may receive a unique identifier (SSID) of the mobile media devices. The transmitting devices may provide this locked on indication and other data to a local central server in the study site, or may send the indication to a remote server. The receiving server may correlate the identity of the fixed media device as a proxy for panelist presence, and may correlate the location of the mobile media device, its identification, the time stamp, and other data to arrive at an indication of media consumption at the mobile media device. The receiving server also may determine favorite locations of the panelist based on movement analysis by the receiving server. In an aspect, received signal strength by the mobile media devices forms the basis for presence determination. In this aspect, programming is not needed on the mobile media devices in order to perform presence determinations.

In an embodiment, the position markers may be provided with a list of personal measurement devices to monitor, and may ignore unknown devices that enter the study site. For example, only personal measurement devices registered by the panelists who reside in the study site are recognized by the position markers.

In addition to panelist presence determination with respect to the fixed media devices, the personal measurement devices may be used with mobile media devices to identify media consumption at the mobile media devices. For example, a mobile media device may include a BILE-enabled radio. The mobile media device may broadcast a signal that is detected by the same position markers that receive signals from the personal measurement devices. A remote server then may correlate signals received from the mobile media devices to signals received from the personal measurement devices to estimate a panelist is in the vicinity of a mobile media device.

In an embodiment, either the local central server or the remote server may determine a place, such as a room within the study site where media consumption occurs, and through correlations disclosed herein, may identify a presence of personal measurement devices during media consumption. The servers may refine the presence determinations to indicate where in a room the personal measurement device (an hence, presumably the panelist) is during the media consumption. Still further, the servers may determine the presence of multiple, known personal measurement devices in a specific room, indicating, perhaps, the presence of multiple panelists.

In yet another aspect, the servers may determine personal measurement device presence based on behavioral signals. For example, a personal measurement device may be moved to a game room in the panelist's residence, and may remain in the game room throughout the night. In this example, the servers may infer that the panelist is not in the game room for this entire time. Such inferences also may be used by the panel operator to determine compliance with carrying or wearing a personal measurement device. For example, if a personal measurement device is determined not to have moved for a threshold time, the servers may determine the panelist is not carrying or wearing the personal measurement device.

The local or remote server may determine personal measurement device (and by inference, panelist) presence using database correlation techniques. For example, each point (location defined with some degree of granularity) in a study site may have associated location characteristics, and a database of those characteristics may be incorporated into the servers, along with algorithms to recognize and process the characteristics data. Upon receiving such characteristics data associated with a specific personal measurement device, the server consults the characteristics database to see if the received characteristics correspond to any of the defined points in the study site. These characteristics may include strength of the broadcast signal, measured angle of arrival of the signal, signal frequency, intercept by one specific position marker, arrival times of the signal at multiple position markers, and other characteristics.

The local or remote server may determine personal measurement device presence based on a combination of several location techniques or mechanisms. For example, a remote server may determine a location of a mobile media device based on a combination of BILE triangulation and RFID proximity detection.

Once the local or remote server estimates the location (x, y, z (optional)) of the personal measurement device, that location can be compared to the intended boundaries of the study site, and if the device is within those boundaries and in proximity to a fixed media device, a data logging event may begin. Alternately, the position markers or the local or remote server may determine a personal measurement device is in proximity to a fixed media device by comparing received signal strength to a threshold value and a data logging event may begin. Such a data logging event may continue as long as the personal measurement device remains in proximity to the fixed media device. In an aspect, the data logging event may end based on conditions of a media device. For example, if the media device is powered off, the data logging event may end.

Figure 1A:
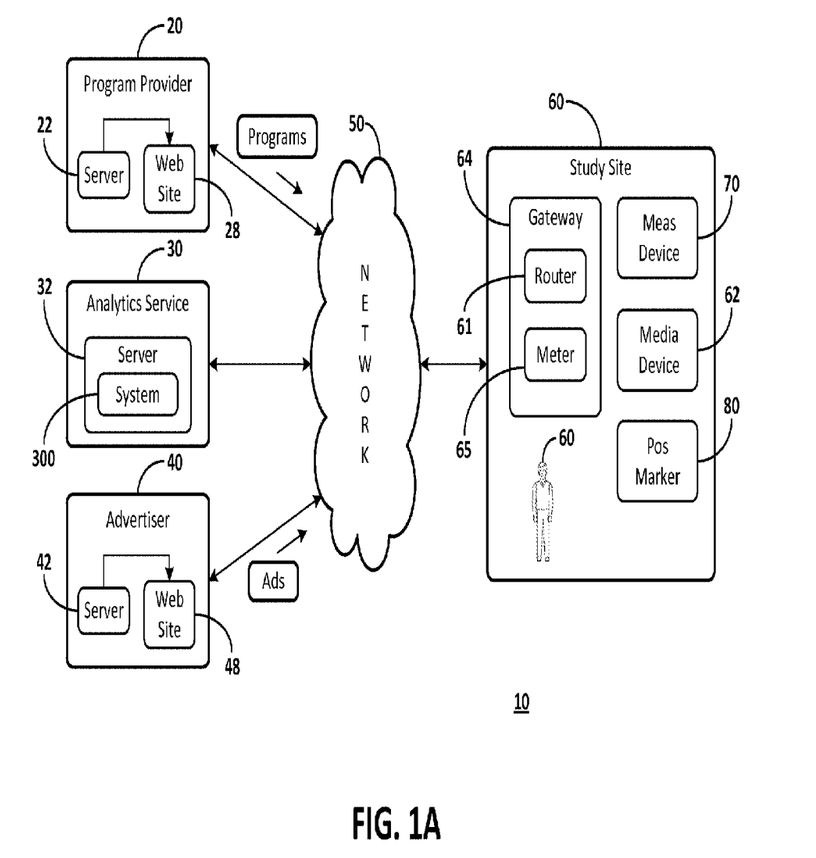
FIGS. 1A-1C illustrate aspects of environments in which media consumption studies may be conducted.

FIG. 1A illustrates an example environment in which media consumption studies may be completed and in which panelist presence is monitored during the display of media at a study site. In FIG. 1A, environment 10 includes program provider 20, analytics service 30, advertiser 40, and study site 60, all of which communicate over network 50. In an embodiment, certain of the entities shown in FIG. 1A may be combined; for example, the program provider 20 and analytics service 30 may be combined into a single entity.

The program provider 20 may operate server 22 to provide programs 24, such as videos, still images, and documents, for viewing at the study site 60. In an aspect, the programs are provided through Web page 28.

The analytics service 30 may operate one or more panels. The analytics service 30 may operate server 32. Processors on the server 32 may execute instructions of system 300 to receive programs and advertisements watched data from media devices at the study site 60 and to receive presence information for panelists at the study site 60. The system 300 may include modules for determining the presence of a panelist based on signals and location information collected at the study site 60. The system 300 may correlate programs and advertisements watched data with the presence information. Alternately, the system 300 may provide the presence information to an analytics system that determines the panelist's viewing history.

The advertiser 40 operates ad server 42 to provide advertisements 44 that may be served to a media device 62. The advertiser 40 may operate the server 42 to provide one or more Web sites 48. The advertiser 20 may provide an advertising campaign that specifies a demographic, a media device type, and other constraints.

The network 50 may be any communications network that allows the transmission of signals, media, messages, voice, and data among the entities shown in FIG. 1A, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless.

Figure 1B:
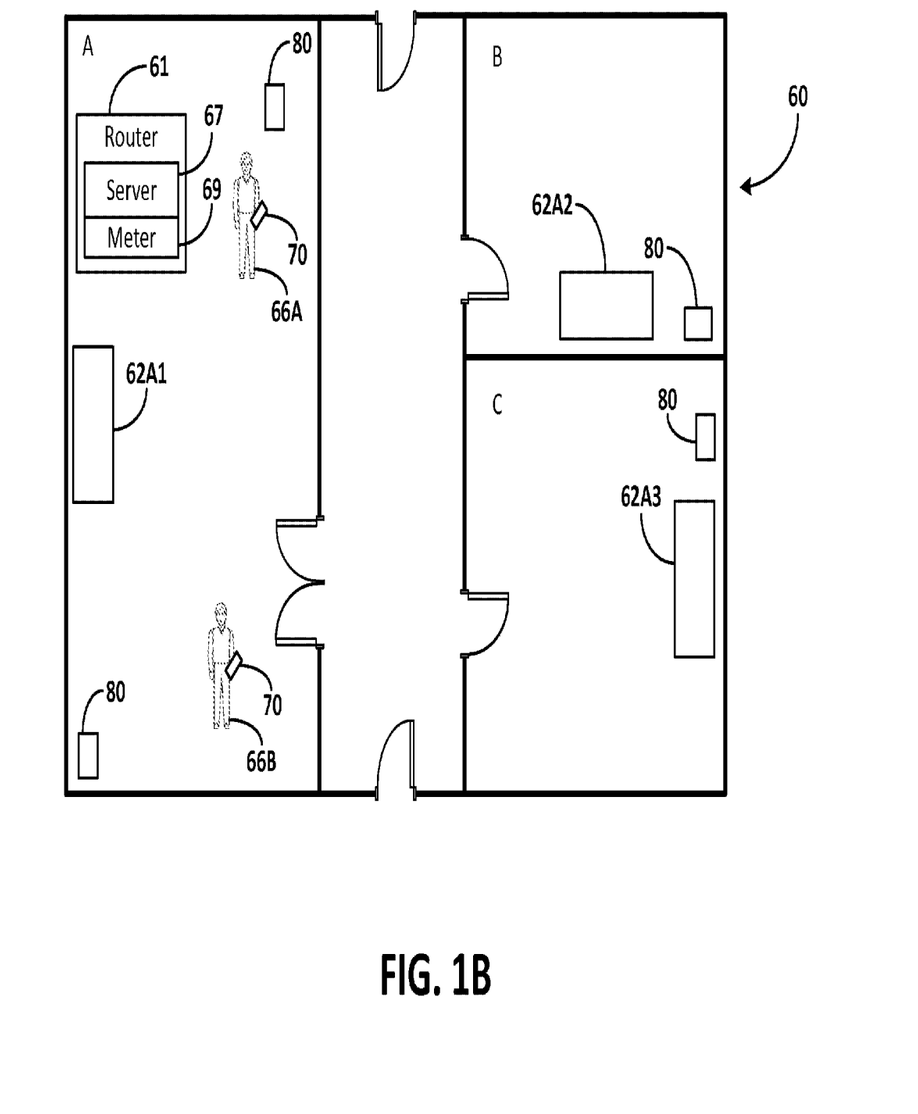

The study site 60, an embodiment of which is shown in more detail in FIG. 1B, includes media devices 62 which receive programs and advertisements through gateway 64. The gateway 64 may include router 61 and meter 65. Also shown at the study site 60 are personal measurement device 70 and position marker 80. Panelists 66 at the study site 60 then may view and/or listen to the programs and advertisements.

The media devices 62 may be fixed or mobile. For example, a media device 62 may be an Internet connected smart television (iTV)(e.g., a television incorporating a processor and a browser); a basic or smart television connected to a set top box (STB) or other Internet-enabled device; a Blu-ray™ player; a game box; and a radio, for example. Another media device 62 may be a tablet, a smartphone, a lap top computer, or a desk top computer, for example. The media devices 62 may include browsers (not shown). The browser may be a software application for retrieving, presenting, and traversing resources such as at the Web site 28. A resource may be identified by a Uniform Resource Locator (URL) and may be a Web page, image, video, or other content. The URL may allow the browser to connect to the Web site 28. Hyperlinks present in resources enable the panelist 66 to navigate the browser to related resources. The panelist 66 may operate the browser to search for Web sites related to specific topics or to search for a specific Web site by URL. The media devices 62 also may include applications (not shown). The panelist 66 may cause a media device 62 execute an application, such as a mobile banking application, to access online banking services. The application may involve use of a browser or other means, including cellular means, to connect to the online banking services. Other applications may include game applications. The game applications may include provisions for serving video advertisements during the play of the game. Once connected to the Web site 28, the media devices 62 may allow viewing of content such as videos and static images generated by entities such as the program provider 20. The videos and static images may include slots or spaces into which programs such as advertisements may be placed.

When such a video or static image is to be viewed on a media device 62, the browser may send an advertisement (ad) request to ad server 42 which may be answered with a video advertisement and/or a static advertisement.

During movement of the panelists 66 in the study site 60 and display of programs and advertisements on the media devices 62, certain personal information related to the panelists 66 and the media devices 62 may be obtained as part of a media consumption study run through analytics service 30.

In situations in which the systems disclosed herein collect personal information about media devices 62 and panelists 66, or may make use of personal information, the panelists 66 may be provided with an opportunity to control whether programs or features collect information (e.g., information about a panelist's social network, social actions or activities, profession, a panelist's preferences, or a panelist's current location), or to control whether and/or how to receive advertisements from an ad server that may be more relevant or of interest to the panelist 66. In addition, certain data may be treated in one or more ways before it is stored or used, so that personally identifiable information is removed. For example, a panelist's identity may be treated so that no personally identifiable information can be determined for the panelist 66, or a panelist's geographic location may be generalized where location information is obtained (such as to a city, ZIP code, or state level), so that a particular location of a panelist 66 cannot be determined. Thus, the panelist 66 may control how information is collected about the panelist 66 and used by an ad advertiser or other entity.

FIG. 1B illustrates study site 60 (a panelist's residence) in more detail. The study site 60 is shown configured to support a media consumption study. In FIG. 1B, residence 60 includes fixed media devices 62A. The residence 60 is the home of multiple panelists 66.

Fixed media devices 62A1, 62A2, and 62A3 are placed in rooms A, B, and C. Located near each of the fixed media devices are position markers 80. In addition, in room A, which is a large room, a second position marker 80 is shown installed. The position markers 80, in an embodiment, may include a BTLE radio and a GSM wall adaptor. The position markers, however, may include other wireless technologies for both the received signals from personal measurement devices and the signal information provided to the remote server. Alternately, a position marker 80 may include a small hardware device connected to an unused HDMI port of a fixed media device 62A.

In an aspect, each of the panelists 66 may agree to wear a bracelet device, or other personal measurement device 70, that broadcasts a signal, which is detected by the position markers 80. In this aspect, the personal measurement device 70 incorporates a BILE beacon. However, other communications technologies, including smart RFID tags, acoustic signaling devices (outside the range of human hearing) and other wireless signaling devices may be used, and the corresponding position markers 80 may be equipped to detect the broadcast signals and relay the signals or information related to the signals to a local or remote server for analysis.

In a specific aspect, each of the panelists 66A and 66B has one or more personal measurement devices 70 that include BTLE beacons, which communicate with the position markers 80. The panelist 66 may register each of the personal measurement devices 70 with the analytics service 30.

Also shown in FIG. 1B is optional local central server 67. Local central server 67 may be installed with an in-home gateway device such as a wireless router 61. The wireless router 61 couples off-site communications servers (e.g., an Internet service provider) with the fixed media devices 62A.

The personal measurement devices 70, position markers 80, and local central server 67 can support data collection from a number of different wireless technologies that are in use in the radio frequency spectrum, including: Bluetooth, Bluetooth Low Energy (BILE), Global System for Mobile Communications (GSM), General Packet Radio Service (GPRS), Code Division Multiple Access (CDMA), Evolution-Data Optimized (EV-DO), Enhanced Data Rates for GSM Evolution (EDGE), CDMA 2000 1×RTT (one times Radio Transmission Technology), 3GSM, High Speed Packet Access (HSPA), Digital Enhanced Cordless Telecommunications (DECT), Digital AMPS (IS-136/TDMA), and Integrated Digital Enhanced Network (iDEN). Fourth generation (4G) devices being developed and deployed include 4G Long Term Evolution (LTE) and 4G WiMAX. Other wireless technologies can be expected. In the embodiment of FIG. 1B, the personal measurement devices 70 communicate with the position markers 80 using BILE signaling, and the position markers 80 communicate with the remote server 32 using WiFi signaling.

The local central server 67 also may include a metering device 69 that records, for each of the fixed and mobile media devices in the residence 60, programs and advertisements watched. The metering device 69 also may record actions taken at the media devices, such as changing channels, pausing live programs, fast forwarding through advertisements, rewinding and replaying programs and advertisements, muting, and other activities.

Assuming panelists 66A and 66B will have in their possession, their respective personal measurement devices 70, movement of the panelists among rooms A, B, and C may be monitored using one or more of the location processes described herein, such as received signal strength, as well as other geo-location processes. Thus, a media consumption study using residence 60 may be able to match panelists 66A and 66B to rooms and fixed media devices 62A over which media is being provided. Moreover, the media consumption determination may be completed without the need for logging in and out by the panelists 66 making manual log entries or completing other burdensome requirements. Thus, the media consumption activities of the panelists 66 in the residence 60 may be monitored in a natural manner.

In an aspect, the personal measurement devices 70 may incorporate BTLE beacons. The beacons periodically broadcast a signal. The broadcast signal may include a unique identification of the personal measurement device. The signal may be detected by one or more of the position markers 80 situated around the study site 60. In an aspect, the position markers 80 are BTLE to WiFi gateways. The position markers 80 may continually scan for BILE signals from the beacons. When received, the position markers 80 may relay the signals along with the received signal strength to the local central server 67. The local central server 67 may process the received signals, or may in turn pass the received signals to a remote server such as the analytics server 32. Alternately, the position markers 80 may provide the information directly to the remote server 32 using a WiFi network, for example. However transmitted to the remote server 32, the information may be provided to the remote server 32 in real time or near real time. Alternately, the information may be stored locally (for example, in server 67 or in the position markers 80) and may be sent to the remote server 32 on a batch basis. In an aspect, the remote server 32 may poll the position markers 80 or the local sever 67 and request the information. In another aspect, the position markers 80 or the local server 67 may send the information periodically (e.g., daily).

At either the local central server 67 or the remote (e.g., analytics) server 32, a collection of the received signals from a single beacon are processed to determine the proximity of the associated panelist 66 to a media device 62A within the study site 60. For example, a signal broadcast by a beacon may be detected by different position markers 80 (e.g., in each of rooms A, B, and C). However, the signal at each of the position markers 80 may be received with a different signal strength and at a different arrival time. These differences in the signal may be used in the position marker 80, or in the server 80 processing the signals as part of the panelist presence determination.

Based on the received signals from the measurement devices 70, the local central server 67 or the remote server 32 may estimate, with some probability, that panelist 66A is near fixed media device 62A, and thus determine if panelist 66A is watching television (in room A), for example. Then, based, for example, on STB logs, or other television viewing logs, including SSP logs, the servers 67 or 32, may attribute programs watched to specific panelists. Thus, the panelist data may be collected and analyzed with little explicit effort required on the part of the panelists 66.

Figure 1C:
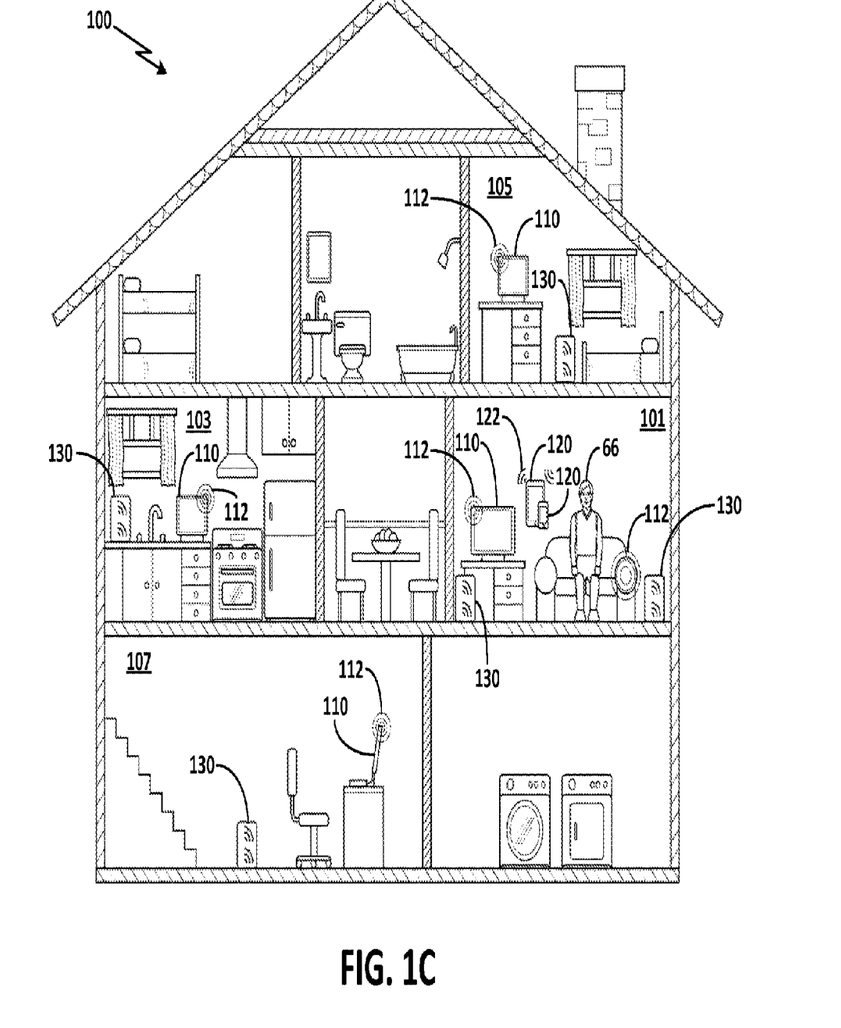

FIG. 1C illustrates another configuration of a study site that supports media consumption studies. In FIG. 1C, study site 100 includes rooms 101, 103, 105, and 107 in which fixed media devices 110 are installed. Each fixed media device 110 has connected thereto a measurement device 112, which incorporates a BTLE radio (see FIG. 1D). Each room 101, 103, 105, and 107 has installed one or more position markers 130, each of which includes a BTLE radio and a GSM radio. In room 101, panelist 66 wears personal measurement device 140. Also in room 101, the panelist 66 operates mobile media devices 120, each of which includes measurement device 122.

The measurement devices 112 and 122 and the personal measurement device 142 periodically broadcast signals that may include unique identifications. A position marker 130 may detect the signals from one or more of the measurement devices 112 and 122. However, the received signal strength and time of signal arrival should vary from position marker to position marker based on the distance of the position marker 130 from the broadcasting measurement device 112, 122, 142.

The position markers 130 may send information related to the detected signals to remote server 32. Processors in the remote server 32 execute instructions to determine locations of the fixed media devices 110, mobile media devices 120, and the panelist 66.

Figure 2A:
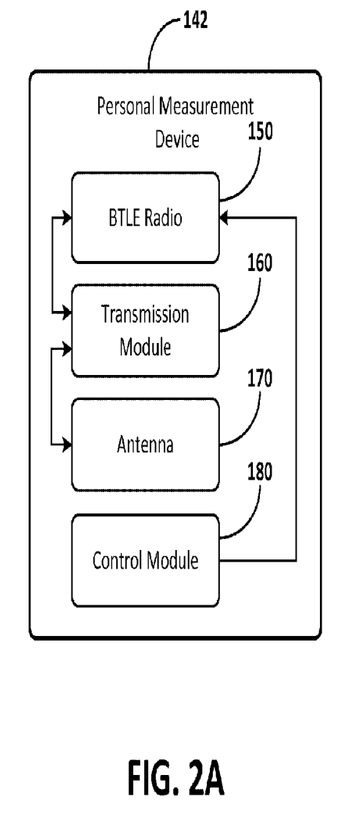
FIGS. 2A and 2B illustrate devices that may be used in media consumption studies.

FIG. 2A illustrates hardware components of a measurement system that may be used in a media consumption study to determine locations of panelists and media devices at a study site. In FIG. 2A, personal measurement device 142 includes BTLE radio 150, transmission module 160, antenna 170 and control module 180. The control module 180 is programmed to control transmission of a signal at a specified periodicity. For example, the control module 180 may include a programmed processor that executes instructions to periodically broadcast the signal. The control module 180 may be implemented in software, hardware, or firmware, or any combination thereof. When implemented in software, the instructions of the control module 180 may be stored in a non-transitory computer-readable storage medium. The signal may include a unique identification of the BTLE radio 150, and hence the personal measurement device 142.

The personal measurement device 142 may be a component of a wrist band, a wrist watch, a key chain, or other small device having a form factor that allows a panelist 66 to easily wear or carry the personal measurement device 142.

Fixed media devices 110 at the study site 100 also may be equipped with measurement devices 112 similar to the personal measurement device 142 and which function in a similar fashion. In addition, mobile media devices 120 also are equipped with measurement devices 122 similar to the personal measurement device 142.

In an embodiment, the devices 112 and 122 may be standalone devices that a panelist 66 couples to the fixed and mobile media devices, respectively. Alternately, some fixed and mobile media devices may have the necessary software and hardware components of measurement devices 112, 122 built in, so that only a minor programming update may be required to broadcast appropriate signals. For example, many mobile telephone include BTLE radios.

Figure 2B:
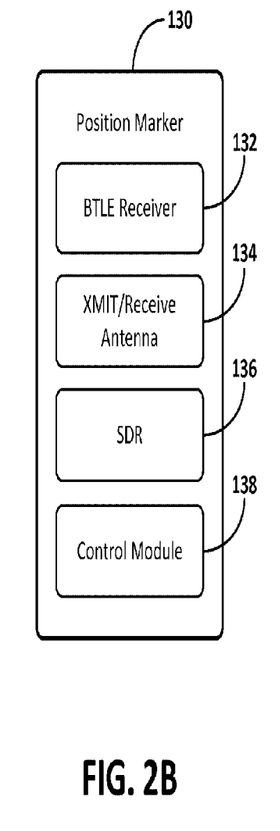

FIG. 2B illustrates an exemplary position marker. In FIG. 2B, position marker 130 includes BTLE receiver 132, transmit/receive antenna 134, software defined radio 136, and control module 138. Wireless signals are received at antenna 134, including signals from wireless devices. However, the control module 138 is programmed only to recognize, and subsequent process, signals from the devices 112, 122, and 142. The control module 138 may be provided with an identification of each of the devices 112, 122, and 142 through a registration process instituted by the panelist 66. Alternately, a panel operator may program position markers 130 to recognize only those devices assigned to a specific panelist 66 or study site 100. The control module 138 may be a programmed processor that executes instructions to receive signals, determine signal strength and time of arrival, and receive identification information for the broadcasting measurement devices 112, 122, and 142. The control module 138 may be implemented in software, hardware, firmware, or any combination thereof. The control module 138 then controls operation of the software defined radio 136 to periodically provide the signal strength, time of arrival, and identification information, and other relevant data, to remote server 32.

Figure 3:
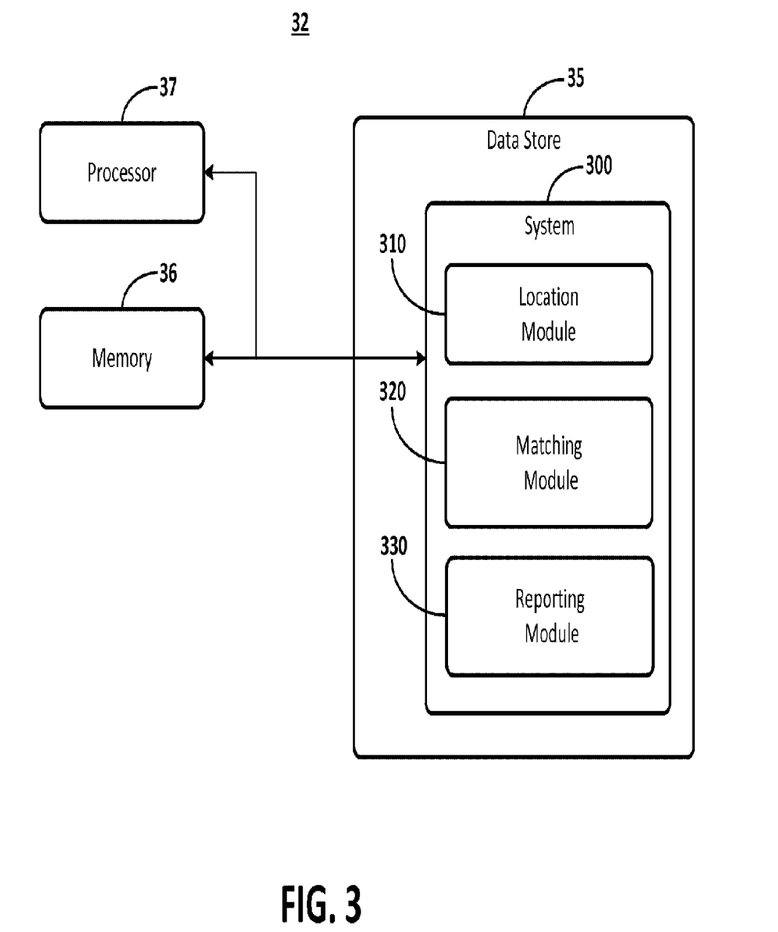
FIG. 3 illustrates a system that may be used with the devices of FIGS. 2A and 2B to support media consumption studies.

FIG. 3 illustrates a system 300 that supports media consumption studies in which panelist proximity to media devices may be determined. In an embodiment, the system 300 estimates locations of panelists and media devices in a study site as part of the proximity determination. In another embodiment, the system 300 determines proximity based on a signal characteristic, such as signal strength of a signal broadcast by a measurement device as received at a position marker. In an embodiment, the system 300 is implemented on server 32 of analytics service 30. For ease of description, the system 300 is described with respect to the study site 100 of FIG. 1C.

In FIG. 3, system 300 is stored in data store 35, which is, or may include a non-transitory computer-readable storage medium. The system 300 may be loaded onto memory 36 and executed by processor 37 over communications and data bus 38. The system 300 includes proximity module 310, optional match module 320, and reporting module 330.

Proximity module 310 receives information related to signals broadcast by personal measurement device 142 worn or carried by panelist 66 participating in the media consumption study and collected by position markers 130 installed at the study site 100. The information may include received signal strength at the position markers 130, identification of the personal measurement device 142, time of arrival of the broadcast signal at the position markers 130, and other information that may be used in the media consumption study. The module 310 further receives information related to signals broadcast by the fixed media device measurement devices 112, which are provided with each of the media devices 110, and signals broadcast by the mobile media device measurement devices 122, which are provided with each of the mobile media devices 120. In the embodiment of FIG. 1C, signals broadcast by the devices 112, 122, and 142 may be received at any of the position markers 130 situated throughout the study site 100. However, received signal strength should be lower and time of arrival later the further a position marker 130 is from the devices 112, 122, and 142. The module 310 stores the received information for subsequent processing by other components of the system 300.

Optional matching module 320 maps the received unique identifier of each of the devices 112 for the fixed media devices 110 to previously provided signal information. Over time, the mapping may establish a fixed location of the fixed media devices 110 and each of the position markers 130 within the study site 100. The mapping module 320 further correlates information received from the position markers 130 for the personal measurement device 142 to map the position of the personal measurement device 142 (and hence, the position of the panelist 66) in the study site 100. For example, referring to FIG. 1C, signal strength should be higher and time of arrival earlier for the two position markers 130 in the room occupied by the panelist 66 than at other position markers 130 in the study site 100. The module 320 may store the panelist position information for subsequent use in determining media consumption based on data received at the analytics service 30 from, for example, set top box logs. The mapping then may be used with programs and advertisements watched data to produce a viewing history for the panelist 66.

The reporting module 330 may provide components of an analytics system (not shown) with panelist presence information including time and date, and specific fixed media device 110 and mobile media device 120 the panelist 66 was most likely viewing. The reporting module 330 also may determine if a specific panelist 66 is complying with the panel requirements of wearing or carrying a personal measurement device while in the study site 100, and may provide this information in an interface that the panel operator may view. Alternately, or in addition, the reporting module 330 may send a prompt to the panelist 66 to wear or carry the personal measurement device 142. For example, the reporting module 330 may determine that a specific personal measurement device 142 has not been moved in the last 24 hours. The reporting module 330 then may send a prompt, using, for example, email or text messaging, reminding the panelist to wear or carry the device 142.

Figure 4:
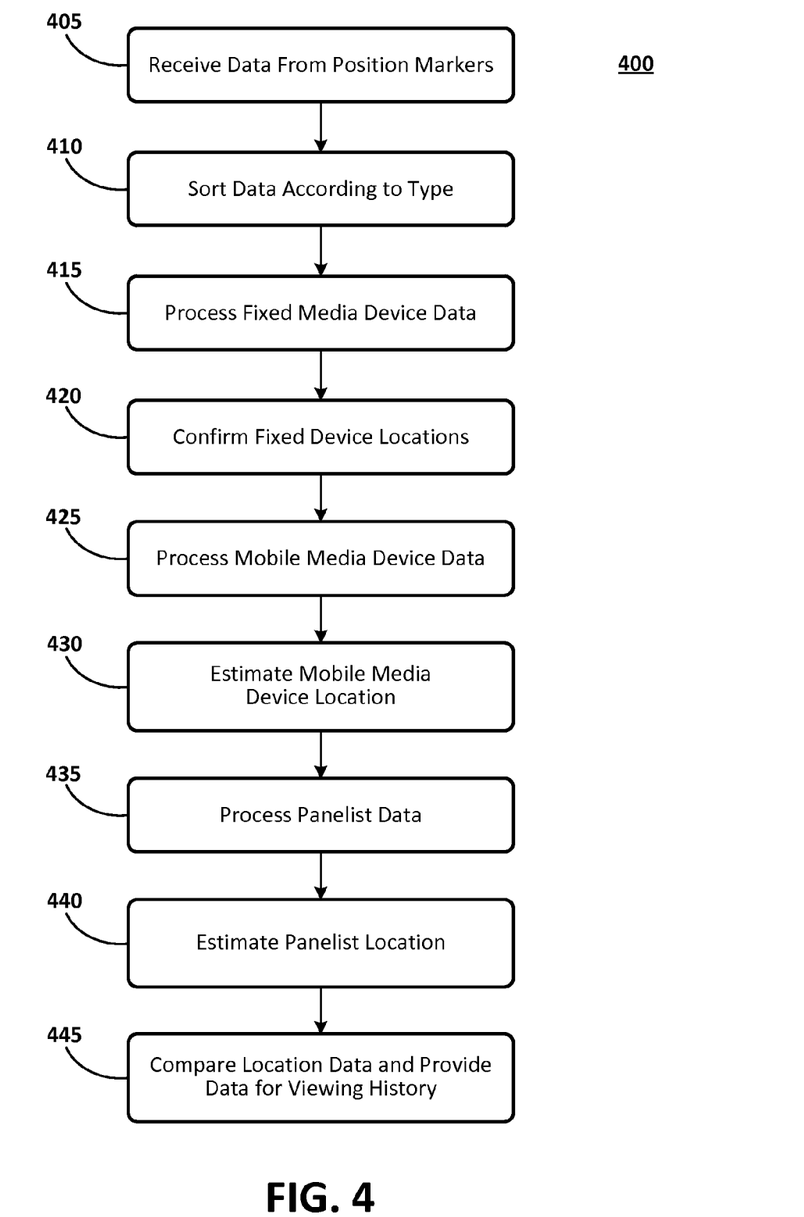
FIG. 4 is a flow chart illustrating an example media consumption method.

FIG. 4 is a flow chart illustrating an example method for determining panelist presence as part of a media consumption study. The method of the flow chart is based on the environment shown in FIG. 1C and the components shown in FIGS. 2A-3.

In FIG. 4, method 400 begins in block 405 when the system 300 receives information from position markers 130 installed at study site 100. The information may be derived from measurement devices 112, 122, and 142. The information may be received on a real time or near real time basis. Alternately, the information may be received by the system 300 periodically or a-periodically, for example, as a batch of information.

In block 410, the system 300 separates the received information according to the measurement device that broadcast the signal. In block 415, the system 300 processes information derived from measurement devices 112 associated with fixed media devices 110. In block 420, the system 300 confirms the fixed media devices 110 are in the places in which the fixed media devices 110 are mapped. In block 425, the system 300 processes information derived from measurement devices 122 for mobile media devices 120. In block 430, the system 300 uses received signal strength and time or arrival at each of the position markers 130 to estimate the positions of the mobile media devices 120. The processing through blocks 405 to 430 thus results in an estimate of the media device locations within the study site 100.

In block 435, the system 300 processes information derived from the personal measurement device 142 based on signals broadcast from the device 142 and received at the position markers 130. In block 440, based on received signal strength and possibly arrival time, the system 300 estimates the location of panelist 66 in the study site 100. In block 445, the system 300 compares the estimated positions of the fixed and mobile media devices in the study site 100 to the estimated position of the panelist 66 and produces an output that indicates which of the fixed and mobile media devices the panelist 66 was viewing for the time period covered by the information derived from the measurement devices 112, 122, and 142; that is, the system 300 determines proximity of the panelist 66 to a media device. The method 400 then ends.

Figure 5:
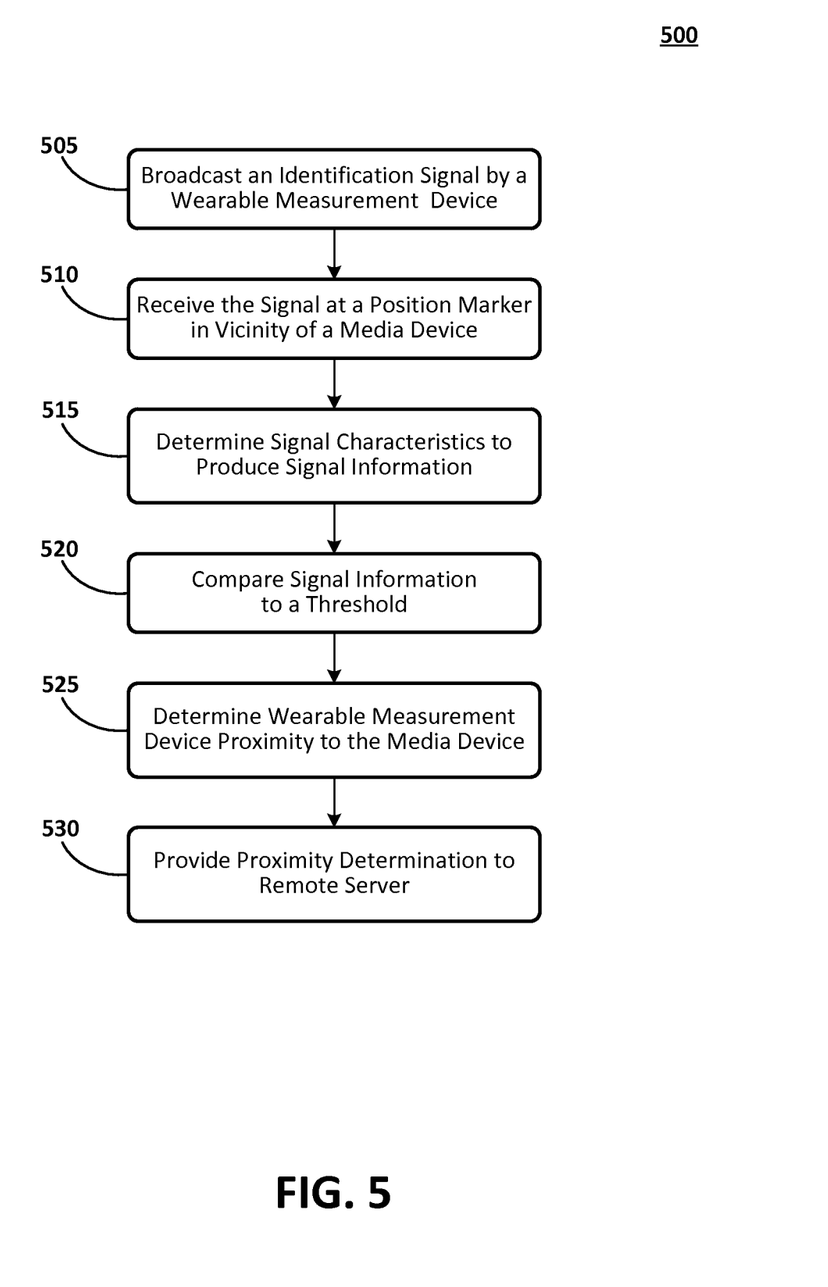
FIG. 5 is a flow chart illustrating an alternate media consumption method.

FIG. 5 is a flow chart illustrating a media consumption study method. The method is based on the study site 60 shown in FIG. 1B and the devices of FIGS. 2A and 2B. In particular, position markers 80 are emplaced in the vicinity of fixed media device (e.g., televisions) 61A.

In FIG. 5, method 500 begins in block 505 when a wearable measurement device 70 broadcasts a signal that may be detected by a position marker 80 at the study site 60. In an embodiment, the broadcast signal is a BTLE signal. In block 510, position marker 80, in the vicinity of media device 61A1 receives the broadcast signal. In block 515, the position marker 80 determines one or more received broadcast signal characteristics. For example, the position marker 80 may determine received signal strength and time of arrival of the received broadcast signal. In addition, the position marker 80 may determine an identification of the measurement device 70 that broadcast the signal.

In block 520, the position marker 80 compares signal characteristics to specified threshold values. In block 525, the position marker 80 determines, based on the comparison, that the measurement device 70 is in proximity to media device 61A1. In block 530, the position marker 80 provides the proximity determination to the remote server 32. As an alternative to the above description of block 520 and 525, the position marker may provide the signal characteristics to a separate server, such as the remote server 32, where the proximity determination is completed. The method 500 then ends.

Certain of the devices shown in the Figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability.

The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flow charts and accompanying description to illustrate the embodiments represented in FIGS. 4 and 5. The disclosed devices, components, and systems contemplate using or implementing any suitable technique for performing the steps illustrated. Thus, FIGS. 4 and 5 are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A position marker for conducting media consumption studies at study sites, comprising:
a receiver configured to receive a first signal from a personal measurement device and a second signal from a measurement device associated with a media device;
a processor configured to measure a received signal strength of each of the first signal and the second signal; and
a transmitter configured to transmit the measurements to a remote device, receipt of the measurements triggering the remote device to:
identify, from a plurality of position markers, the position marker as a most proximate position marker to the personal measurement device, based on the measurements of the first signal performed by the position marker and measurements of the first signal performed by at least one other position marker of the plurality of position markers,
estimate a displacement of the personal measurement device relative to the media device based on the measurements of the first signal and second signal performed by the position marker and
identify a panelist associated with the personal measurement device as consuming media from the media device, responsive to the estimated displacement being less than a threshold.

2. The position marker of claim 1, wherein the receiver is further configured to periodically receive the first signal from the personal measurement device and the second signal from the measurement device, the first signal including a sequence number;
wherein the transmitter is further configured to transmit the sequence number included with the measurements to the remote device, receipt of the measurements triggering the remote device to determine that the personal measurement is in proximity to the media device.

3. The position marker of claim 1, wherein the processor is further configured to determine that the personal measurement device is proximate to the media device based on the first signal and on the second signal.

4. The position marker of claim 1, wherein the transmitter is further configured to transmit the measurements to the remote device, receipt of the measurements triggering the remote device to determine that the personal measurement device is in proximity to the media device based on the identification of the position marker as the most proximate.

5. The position marker of claim 1, wherein the transmitter is further configured to transmit the measurements to the remote device, receipt of the measurements triggering the remote device to determine that the panelist consumed media at the media device based on the identification of the position marker as the most proximate.

6. The position marker of claim 1, wherein the transmitter is further configured to transmit the measurements to the remote device, receipt of the measurements triggering the remote device to identify the position marker as registered from a list of registered position markers.

7. The position marker of claim 1, wherein the transmitter is further configured to transmit the measurements to the remote device, receipt of the measurements triggering the remote device to correlate the measurements from the position marker with second measurements from a second position marker to determine a location of the personal measurement device.

8. The position marker of claim 1, wherein the transmitter is further configured to transmit the measurements to the remote device, responsive to a request for measurements from the remote device.

9. The position marker of claim 1, wherein the processor is further configured to measure the received signal strength, responsive to determining that the personal measurement device and the media device are registered to the panelist.

10. The position marker of claim 1, wherein the first signal comprises a first radio frequency (RF) signal or a first acoustic signal and the second signal comprises a second RF signal or a second acoustic signal.

11. A method of conducting media consumption studies at study sites, comprising:
receiving, by a receiver of a position marker, a first signal from a personal measurement device and a second signal from a measurement device associated with a media device;
measuring, by a processor of the position marker, a received signal strength of each of the first signal and the second signal; and
transmitting, by a transmitter of the position marker, the measurements to a remote device, receipt of the measurements triggering the remote device to:
identify, from a plurality of position markers, the position marker as a most proximate position marker to the personal measurement device, based on the measurements of the first signal performed by the position marker and measurements of the first signal performed by at least one other position marker of the plurality of position markers,
estimate a displacement of the personal measurement device relative to the media device based on the measurements of the first signal and second signal performed by the position marker and
identify a panelist associated with the personal measurement device as consuming media from the media device, responsive to the estimated displacement being less than a threshold.

12. The method of claim 11, wherein receiving the first signal and the second signal further comprises periodically receiving the first signal from the personal measurement device and the second signal from the measurement device, the first signal including a sequence number; and
wherein transmitting the measurements further comprises transmitting the sequence number included with the measurements to the remote device, receipt of the measurements triggering the remote device to determine that the personal measurement is in proximity to the media device.

13. The method of claim 11, further comprising determining, by the processor of the position marker, determine that the personal measurement device is proximate to the media device based on the first signal and on the second signal.

14. The method of claim 11, wherein transmitting the measurements further comprises transmitting the measurements to the remote device, receipt of the measurements triggering the remote device to determine that the personal measurement device is in proximity to the media device based on the identification of the position marker as the most proximate.

15. The method of claim 11, wherein transmitting the measurements further comprises transmitting the measurements to the remote device, receipt of the measurements triggering the remote device to determine that the panelist consumed media at the media device based on the identification of the position marker as the most proximate.

16. The method of claim 11, wherein transmitting the measurements further comprises transmitting the measurements to the remote device, receipt of the measurements triggering the remote device to identify the position marker as registered from a list of registered position markers.

17. The method of claim 11, wherein transmitting the measurements further comprises transmitting the measurements to the remote device, receipt of the measurements triggering the remote device to correlate the measurements from the position marker with second measurements from a second position marker to determine a location of the personal measurement device.

18. The method of claim 11, wherein transmitting the measurements further comprises transmitting the measurements to the remote device, responsive to a request for measurements from the remote device.

19. The method of claim 11, wherein measuring the measurements further comprises measuring the received signal strength, responsive to determining that the personal measurement device and the media device are registered to the panelist.

20. The method of claim 11, wherein receiving the first signal and the second signal further comprises receiving the first signal as a first radio frequency (RF) signal or a first acoustic signal and receiving the second signal as a second RF signal or a second acoustic signal.

\* \* \* \* \*